United States Patent
Gambhir et al.

(10) Patent No.: US 9,068,502 B2
(45) Date of Patent: Jun. 30, 2015

(54) EGR FLOW MEASUREMENT

(75) Inventors: Gurpreet Gambhir, Peoria, IL (US);
Rammohan Sankar, Dunlap, IL (US);
Travis Barnes, Metamora, IL (US);
Zenebe Gete, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 960 days.

(21) Appl. No.: 13/231,106

(22) Filed: Sep. 13, 2011

(65) Prior Publication Data
US 2013/0061831 A1    Mar. 14, 2013

(51) Int. Cl.
| F02M 25/07 | (2006.01) |
| F02B 47/08 | (2006.01) |
| F01N 3/00 | (2006.01) |
| G06F 19/00 | (2011.01) |

(52) U.S. Cl.
CPC . *F02B 47/08* (2013.01); *F01N 3/00* (2013.01); *G06F 19/00* (2013.01); *Y02T 10/121* (2013.01)

(58) Field of Classification Search
CPC ..... Y02T 10/121; Y02T 10/47; Y02T 10/144; F02M 25/07; F02M 25/0707; F02B 47/08; G01F 25/0007; G01F 1/74; G01F 1/00; G06F 17/00; A61M 2209/02
USPC ............. 123/568.11, 568.12, 568.15, 568.17, 123/568.18, 568.2, 568.21; 60/278, 279, 60/280, 605.1, 602.2, 605.3; 73/114.06, 73/114.32, 114.33, 114.36; 702/45; 701/106, 108
See application file for complete search history.

(56) References Cited

U.S. PATENT DOCUMENTS

| 4,433,666 | A | | 2/1984 | Masaki et al. |
| 5,190,017 | A | | 3/1993 | Cullen et al. |
| 6,125,830 | A | * | 10/2000 | Kotwicki et al. ........ 123/568.21 |
| 6,408,833 | B1 | * | 6/2002 | Faletti ...................... 123/568.17 |
| 6,742,335 | B2 | * | 6/2004 | Beck et al. ................... 60/605.2 |
| 7,089,738 | B1 | | 8/2006 | Boewe et al. |
| 7,320,220 | B1 | | 1/2008 | Atkinson |
| 8,196,403 | B2 | * | 6/2012 | Hittle et al. ...................... 60/602 |
| 8,297,053 | B2 | * | 10/2012 | Gladden et al. .............. 60/605.2 |
| 2002/0069862 | A1 | * | 6/2002 | Faletti ...................... 123/568.17 |
| 2002/0073979 | A1 | * | 6/2002 | Lepp et al. .............. 123/568.18 |
| 2004/0182373 | A1 | * | 9/2004 | Li et al. .................... 123/568.12 |
| 2008/0162018 | A1 | | 7/2008 | Dea et al. |
| 2009/0084348 | A1 | * | 4/2009 | Batenburg et al. ............. 123/294 |
| 2010/0024414 | A1 | * | 2/2010 | Hittle et al. ...................... 60/602 |
| 2010/0024416 | A1 | * | 2/2010 | Gladden et al. .............. 60/605.2 |
| 2010/0145598 | A1 | * | 6/2010 | Piper ............................. 701/108 |
| 2010/0199639 | A1 | * | 8/2010 | Matsunaga et al. ............. 60/278 |

(Continued)

FOREIGN PATENT DOCUMENTS

JP    2009299590    12/2009

*Primary Examiner* — Hai Huynh
*Assistant Examiner* — Raza Najmuddin
(74) *Attorney, Agent, or Firm* — Leydig, Voit & Mayer, Ltd.

(57) ABSTRACT

A system and method for measuring an EGR flow rate for an engine having an EGR valve with a selectable EGR valve position and a venturi sensor situated to take a differential pressure measurement relative to recirculated exhaust gas includes determining an EGR valve effective area based on the EGR valve position, determining a weighting factor based on the effective area, calculating a first EGR flow estimate based on the effective area, and calculating a second EGR flow estimate based on the differential pressure measurement of the venturi sensor. A final EGR flow rate is determined based on the weighting factor, the first EGR flow estimate, and the second EGR flow estimate.

20 Claims, 7 Drawing Sheets

(56) References Cited

U.S. PATENT DOCUMENTS

2011/0023847 A1 2/2011 Gates et al.
2012/0222419 A1* 9/2012 Hittle et al. .................. 60/605.1
2013/0276766 A1* 10/2013 Subramanian ............ 123/568.21
2014/0251287 A1* 9/2014 Takezoe ................... 123/568.11

* cited by examiner

EGR FLOW MEASUREMENT

TECHNICAL FIELD

This disclosure relates generally to an internal combustion engine and, more particularly, to an internal combustion engine with a flow controlled exhaust gas recirculation system with improved flow measurement.

BACKGROUND

An exhaust gas recirculation system may be used to reduce the generation of undesirable pollutant gases during the operation of internal combustion engines. Exhaust gas recirculation systems generally recirculate exhaust gas generated during the combustion process into the intake air supply of the internal combustion engine. The exhaust gas introduced into the engine cylinders displaces a volume of the intake air supply that would otherwise be available for oxygen. Reduced oxygen concentrations lower the maximum combustion temperatures within the cylinders and slow the chemical reactions of the combustion process, which decreases the formation of oxides of nitrogen ($NO_x$).

Many internal combustion engines having such an exhaust gas recirculation system also have one or more turbochargers. Exhaust gas from the combustion cylinders is typically used to drive the turbocharger of the turbocharger which, in turn, drives the compressor of the turbocharger to compress fluid that is subsequently supplied to the combustion cylinders. A portion of the exhaust gas may also be diverted from the exhaust system used to drive the turbocharger and into the exhaust gas recirculation system.

EGR flow measurement has been attempted in the past. For example, U.S. Patent Application No. US 20100145598A1 discloses an exhaust gas recirculation measurement system wherein the total gas flow of the engine is calculated by measuring temperature and pressure at the engine intake. The fresh airflow is measured by a venturi in the flow path for fresh air for combustion by the engine prior to the introduction of the EGR flow. The difference between the calculated total flow and fresh airflow is the actual EGR flow which is used to set the EGR relative to total flow.

The foregoing background discussion is intended solely to aid the reader. It is not intended to limit the innovations described herein nor to limit or expand the prior art discussed. Thus the foregoing discussion should not be taken to indicate that any particular element of a prior system is unsuitable for use with the innovations described herein, nor is it intended to indicate any element, including solving the motivating problem, to be essential in implementing the innovations described herein. The implementations and application of the innovations described herein are defined by the appended claims.

SUMMARY

In one aspect of the disclosure, a method is provided for measuring an EGR flow rate for an engine having an EGR valve with a selectable EGR valve position and having a venturi sensor situated to take a differential pressure measurement relative to recirculated exhaust gas. The method comprises determining an EGR valve effective area based on the EGR valve position, determining a weighting factor based on the EGR valve effective area, calculating a first EGR flow estimate based on the EGR valve effective area, and calculating a second EGR flow estimate based on the differential pressure measurement of the venturi sensor. A final EGR flow rate is determined based on the weighting factor, the first EGR flow estimate, and the second EGR flow estimate.

In another aspect, an engine exhaust gas recirculation system is provided having an EGR valve for selectively redirecting engine exhaust to an air intake of the engine via a flow path, the EGR valve having a position and a position sensor associated therewith, as well as a venturi pressure sensor located in the flow path for sensing a differential pressure based at least in part on the flow of redirected engine exhaust. A flow calculator for determining a rate of flow of the redirected engine exhaust includes a position-based estimator for generating a first estimate of the flow based on the position of the EGR valve, a pressure-based estimator for generating a second estimate of the flow based the differential pressure sensed by the venturi pressure sensor, and a weighting module for weighting the first and second estimates of the flow based on the EGR valve position.

In yet another aspect, a nontransitory computer-readable medium is provided having thereon computer-executable instructions for determining an EGR flow in an engine system having an EGR valve with a selectable EGR valve position and a venturi sensor situated to take a differential pressure measurement relative to the recirculated exhaust gas. The computer-executable instructions includes instructions for determining an EGR valve effective area based on the EGR valve position, determining a weighting factor based on the EGR valve effective area, instructions for calculating a first EGR flow estimate based on the EGR valve effective area, and instructions for calculating a second EGR flow estimate based on the differential pressure measurement of the venturi sensor. The instructions also include instructions for determining a final EGR flow rate based on the weighting factor, the first EGR flow estimate, and the second EGR flow estimate.

Other features and advantages of the described systems and methods will be appreciated from the detailed description in conjunction with the attached drawings of which:

DETAILED DESCRIPTION

Figure 1:
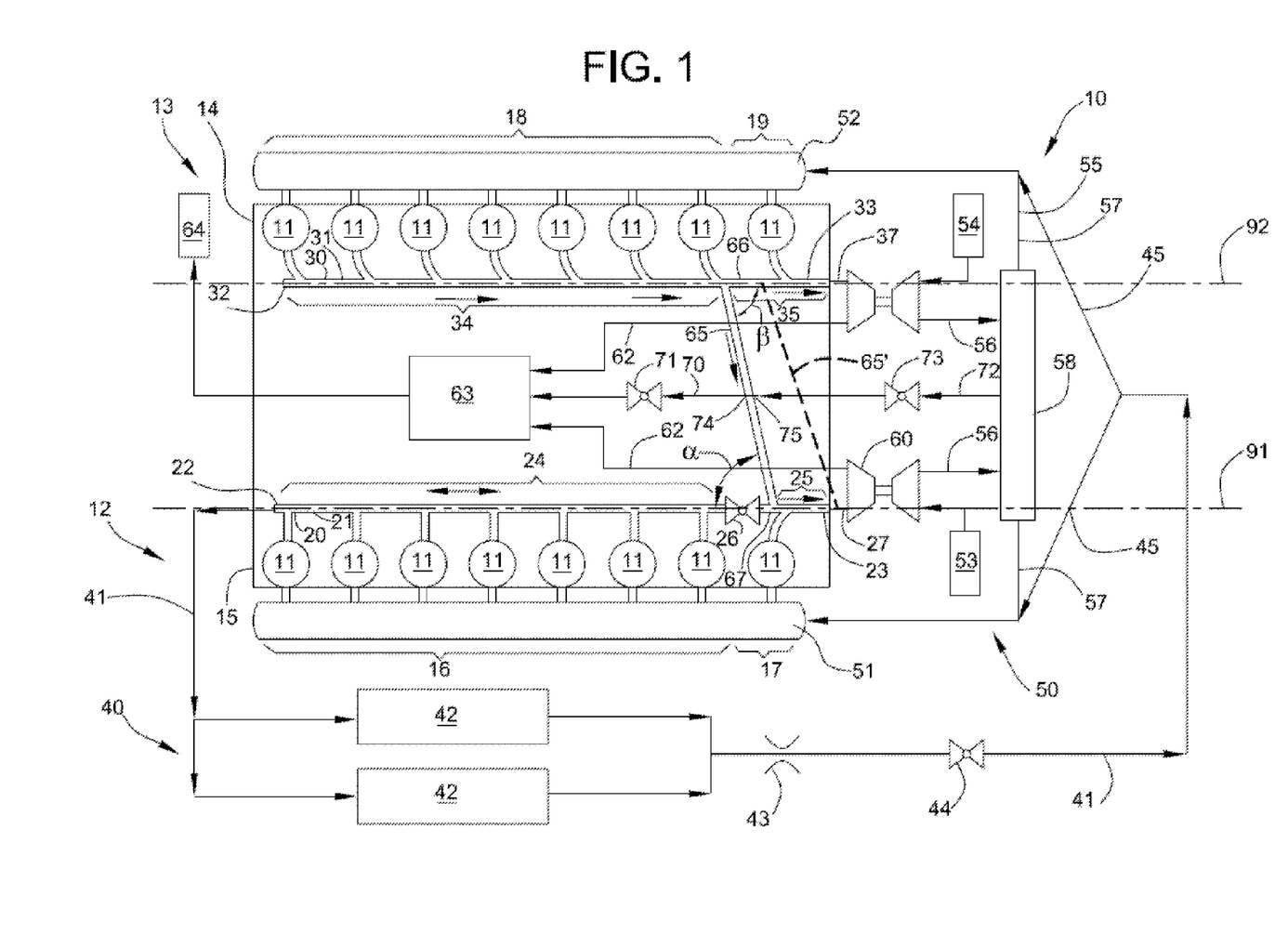
FIG. 1 is a schematic illustration of an internal combustion engine in accordance with the disclosure.

FIG. 1 depicts an internal combustion engine 10 having a plurality of combustion cylinders 11 configured as a first cylinder bank 12 and a second cylinder bank 13 generally parallel to the first cylinder bank. A first exhaust gas line 20 is fluidly connected to the first cylinder bank 12 and a second exhaust gas line 30 is fluidly connected to the second cylinder bank 13. Compressed air is supplied to the first and second cylinder banks 12, 13 by air intake 50. An exhaust gas recirculation system 40 provides for the recirculation of exhaust gas into the air intake 50 in order to reduce the emissions of the internal combustion engine 10.

A first cylinder head 14 is secured to the internal combustion engine 10 adjacent the first cylinder bank 12 and a second cylinder head 15 is secured to the internal combustion engine adjacent the second cylinder bank 13 of combustion cylinders. The first cylinder bank 12 includes a first cylinder group 16 and a second cylinder group 17. The second cylinder bank 13 includes a first cylinder group 18 and a second cylinder group 19. While the first cylinder group 16 of first cylinder bank 12 and the first cylinder group 18 of the second cylinder bank 13 are each depicted with seven combustion cylinders 11 and the second cylinder group 17 of the first cylinder bank 12 and the second cylinder group 19 of the second cylinder bank 13 are each depicted with one combustion cylinder 11, the combustion cylinders of each cylinder bank may be grouped as desired to define or form cylinder groups having different numbers of combustion cylinders.

First exhaust gas line 20 includes a first exhaust manifold 21 that is fluidly connected to the first cylinder bank 12. First exhaust manifold 21 has a first end 22 and an opposite exhaust end 23 with a first section 24 and a second section 25 between the two ends. An exhaust gas control valve 26 is positioned between the first section 24 and the second section 25. A first extension pipe 27 extends between the exhaust end 23 of first exhaust manifold 21 and first turbocharger 60 and fluidly connects the first exhaust manifold to the first turbocharger.

Second exhaust gas line 30 includes a second exhaust manifold 31 that is fluidly connected to the second cylinder bank 13. The second exhaust manifold 31 is generally parallel to the first exhaust manifold and has a first end 32 and an opposite exhaust end 33 with a first section 34 and a second section 35 between the two ends. A second extension pipe 37 extends between the exhaust end 33 of the second exhaust manifold 31 and second turbocharger 61 and fluidly connects the second exhaust manifold to the second turbocharger.

Exhaust gas from the first cylinder group 16 of the first cylinder bank 12 is received within the first section 24 of the first exhaust manifold 21 and, depending upon the positions of exhaust gas control valve 26 and exhaust gas recirculation valve 44, may be routed through the exhaust gas recirculation system 40. The exhaust gas recirculation system 40 includes an exhaust gas recirculation duct 41 that is fluidly connected to the first end 22 of the first exhaust gas line 20 so that exhaust gas from the first cylinder group 16 of the first cylinder bank 12 may be routed or recirculated through the exhaust gas recirculation system and introduced into the combustion air intake 50.

Exhaust gas passing through exhaust gas recirculation duct 41 is cooled by one or more cooling components 42. The flow rate through exhaust gas recirculation duct 41 is monitored by a flow meter 43 which, in an embodiment, is a venturi-type flow meter. Such flow meters operate by sensing a pressure differential created by the speed of a fluid or gas, allowing the speed and hence the flow rate to be calculated. While such sensors can be highly accurate in some flow regimes, they are not sufficiently accurate at low flow rates to allow accurate exhaust metering and valve control. This issue will be discussed in greater detail later.

An exhaust gas recirculation valve 44 is provided along exhaust gas recirculation duct 41 to control exhaust gas flow through the exhaust gas recirculation system 40. Exhaust gas recirculation valve 44, together with exhaust gas control valve 26, controls the amount of exhaust gas that is mixed with air that has been compressed by the first turbocharger 60 and the second turbocharger 61 prior to the air entering the first intake manifold 51 and the second intake manifold 52. The exhaust gas recirculation duct 41 of the exhaust gas recirculation system 40 splits into two separate legs 45. Each leg 45 fluidly connects to the air intake 50 between the aftercooler 58 and the first intake manifold 51 and the second intake manifold 52, respectively.

Air intake 50 includes a first air intake 53 through which atmospheric air enters the first turbocharger 60, a second air intake 54 through which atmospheric air enters the second turbocharger 61 and a compressed air line 55 through which compressed air is fed to combustion cylinders 11. Atmospheric air is compressed by the first and second turbochargers 60, 61 and passes through first compressed air lines 56 to aftercooler 58. Cooled compressed air exits the aftercooler 58 and enters second compressed air lines 57 that are each fluidly connected to a respective one of the first and second intake manifolds 51, 52. Each leg 45 of the exhaust gas recirculation system 40 intersects with and fluidly connects to a respective one of the second compressed air lines 57 between the aftercooler 58 and the first and second intake manifolds 51, 52. In this way, exhaust gas may be mixed with intake air provided to the combustion cylinders 11.

A portion of exhaust gas from the first cylinder group 16 of the first cylinder bank 12 is, at times, routed through the exhaust gas recirculation system 40 rather than through the first exhaust gas line 20. For this reason, a duct or exhaust gas balance tube 65 is fluidly connected between the first exhaust gas line 20 and the second exhaust gas line 30 to balance or equalize, to a controllable extent, the amount of exhaust gas passing through the first and second turbochargers 60, 61. More specifically, second exhaust manifold 31 includes an upstream balance tube connection port 66 (FIGS. 1-3) between the first section 34 of second exhaust manifold 31 and the second section 35 of the second exhaust manifold.

First exhaust manifold 21 includes a downstream balance tube connection port 67 positioned between exhaust gas control valve 26 and the second section 25 of the first exhaust manifold 21. In other words, the upstream balance tube connection port 66 fluidly connects one end of exhaust gas balance tube 65 to the second exhaust manifold 31 and the downstream balance tube connection port 67 fluidly connects the opposite end of the exhaust gas balance tube to the first exhaust manifold 21 to permit exhaust gas to pass from the second exhaust gas line 30 to the first exhaust gas line 20. The exhaust gas balance tube 65 provides a path for exhaust gas to travel from second exhaust gas line 30 towards first exhaust gas line 20 to balance the flow through the first and second turbochargers 60, 61.

It should be noted that while the upstream balance tube connection port 66 is depicted as being positioned between the first section 34 of the second exhaust manifold 31 and the second section 35 of the second exhaust manifold, the upstream balance tube connection port may alternatively be positioned elsewhere along the second exhaust manifold 31 to provide the desired amount of exhaust gas through exhaust gas balance tube 65. For example, moving the upstream balance tube connection port 66 upstream or towards first end 32 of second exhaust manifold 31 will result in fewer combustion cylinders 11 being included in first cylinder group 18 of second cylinder bank 13 and thus exhaust gas from fewer combustion cylinders will be available for passage through exhaust gas balance tube 65 to first exhaust gas line 20.

Downstream balance tube connection port 67 is depicted as being positioned between the exhaust gas control valve 26 and the second section 25 of the first exhaust manifold 21. However, the downstream balance tube connection port 67 may be positioned at other locations along the first exhaust manifold 21 as well as other positions along the first exhaust gas line 20, such as that depicted in phantom at 65' in FIG. 1 and connected to the first extension pipe 27 between the first exhaust manifold and the first turbocharger 60.

Exhaust gas balance tube 65 and upstream balance tube connection port 66 engage or meet second exhaust gas line 30 at an angle "β" relative to centerline 92 of second exhaust manifold 31. In order to minimize pressure drop though the exhaust gas balance tube 65, it is believed that setting angle "β" at an angle less than ninety degrees will result in acceptable flow characteristics and setting angle "β" at less than approximately eighty degrees will further reduce the pressure drop and still smaller angles will likely reduce the pressure drop to a greater extent. The exact angle may be set by based upon air flow characteristics and desired routing of the exhaust gas balance tube 65 within the physical space limitations of the internal combustion engine.

Exhaust gas balance tube 65 and the downstream balance tube connection port 67 engage or meet first exhaust gas line 20 at an angle "α" relative to centerline 91 of first exhaust manifold 21. With this configuration, exhaust gas flowing from the second exhaust gas line 30 through exhaust gas balance tube 65 into first exhaust gas line 20 does not enter first exhaust gas line 20 in a perpendicular fashion relative to first exhaust gas line 20 and thus pressure drop through the exhaust gas balance tube 65 is reduced. In addition, since the exhaust gas traveling downstream through first exhaust gas line 20 drives the first turbocharger 60, it is desirable that the exhaust gas passing through the exhaust gas balance tube 65 into the first exhaust gas line 20 minimizes any disruption to the flow or momentum of the exhaust gas from first cylinder group 16 of first cylinder bank 12 as it passes downstream balance tube connection port 67. By positioning the downstream balance tube connection port 67 at an appropriate angle relative to the centerline of the first exhaust gas line 20, disruption of the flow through the first exhaust gas line may be reduced or minimized. It is believed that setting the angle "α" to less than ninety degrees will result in acceptable flow characteristics. It is further believed that setting the angle "α" at less than approximately seventy-five degrees will result in a configuration that will minimize disruption of air flow within the first exhaust gas line 20. The exact angle may be set based upon air flow characteristics and desired routing of the exhaust gas balance tube 65 within the physical space limitations of the internal combustion engine. It should be noted that angles "α" and "β" are not necessarily within a horizontal or a vertical plane relative to internal combustion engine 10 nor do they need to be identical angles.

Exhaust gas from the first cylinder bank 12 and second cylinder bank 13 passes through the first and second turbochargers 60, 61, respectively, and exits the turbochargers through turbocharger exhaust gas lines 62. Turbocharger exhaust gas lines 62 are fluidly connected to a filter 63 so that the exhaust gas is filtered prior to being discharged or released to the atmosphere through exhaust gas outlet 64.

Under certain operating conditions, it may be desirable to reduce the shaft speed of the first and second turbochargers 60, 61 so that the turbochargers may be maintained within a desired operating range. In order to do so, the amount of exhaust gas passing through the first and second exhaust gas lines 20, 30 may be reduced by venting or releasing a desired amount of exhaust gas from the exhaust gas lines. Such exhaust gas may be released in a relatively consistent manner from both the first and second exhaust gas lines 20, 30 by utilizing a wastegate 70 that is fluidly connected at wastegate interconnection 74 to exhaust gas balance tube 65 to permit exhaust gas to be released from the wastegate. A wastegate valve 71 controls or regulates the flow of exhaust gas through wastegate 70. By fluidly connecting wastegate 70 to exhaust gas balance tube 65, exhaust gas within the first and second exhaust gas lines 20, 30 may be reduced in a relatively uniform manner so that a reduction in shaft speed of the first and second turbochargers 60, 61 will also occur in a relatively uniform manner.

Under certain other operating conditions, it may be desirable to reduce the pressure within the compressed air line 55. In such case, a compressor bypass 72 and its associated compressor bypass valve 73 may be used to control or regulate the venting or release of compressed air from the compressed air line 55. In order to increase the efficiency of internal combustion engine 10, the compressor bypass 72 fluidly connects the compressed air line 55 at aftercooler 58 (but before the compressed air is cooled within the aftercooler) with the exhaust gas balance tube 65 at compressor bypass interconnection 75. In an alternate design, the compressor bypass may extend from any portion of compressed air line 55, including a portion positioned after the aftercooler 58. In addition, the compressor bypass may be routed to fluidly connect to the exhaust gas system at a location other than the exhaust gas balance tube 65 including either or both of the first and second exhaust gas lines 20, 30.

Figure 2:
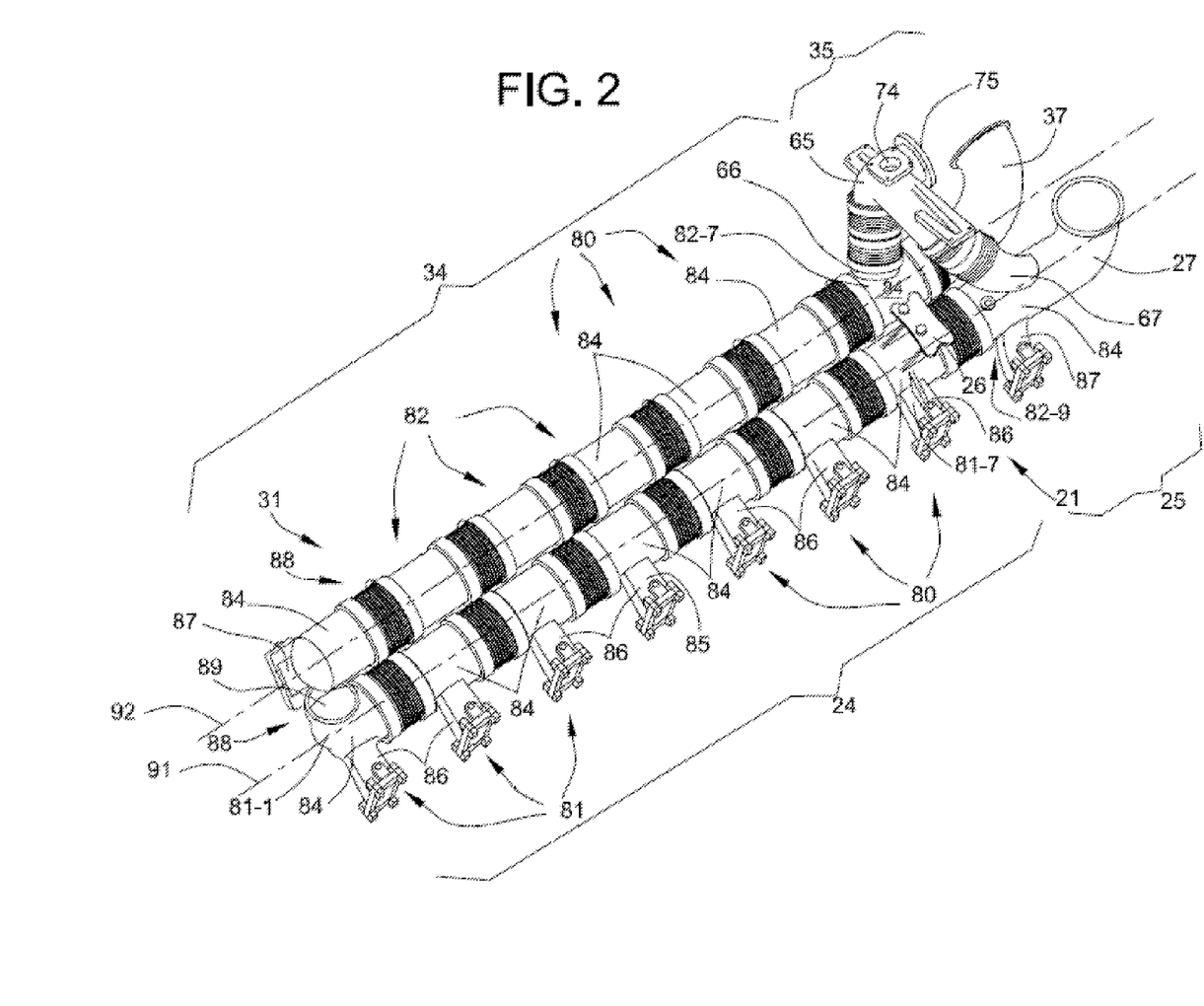
FIG. 2 is a perspective view of the exhaust manifolds and the exhaust gas balance tube in accordance with the disclosure.
Figure 3:
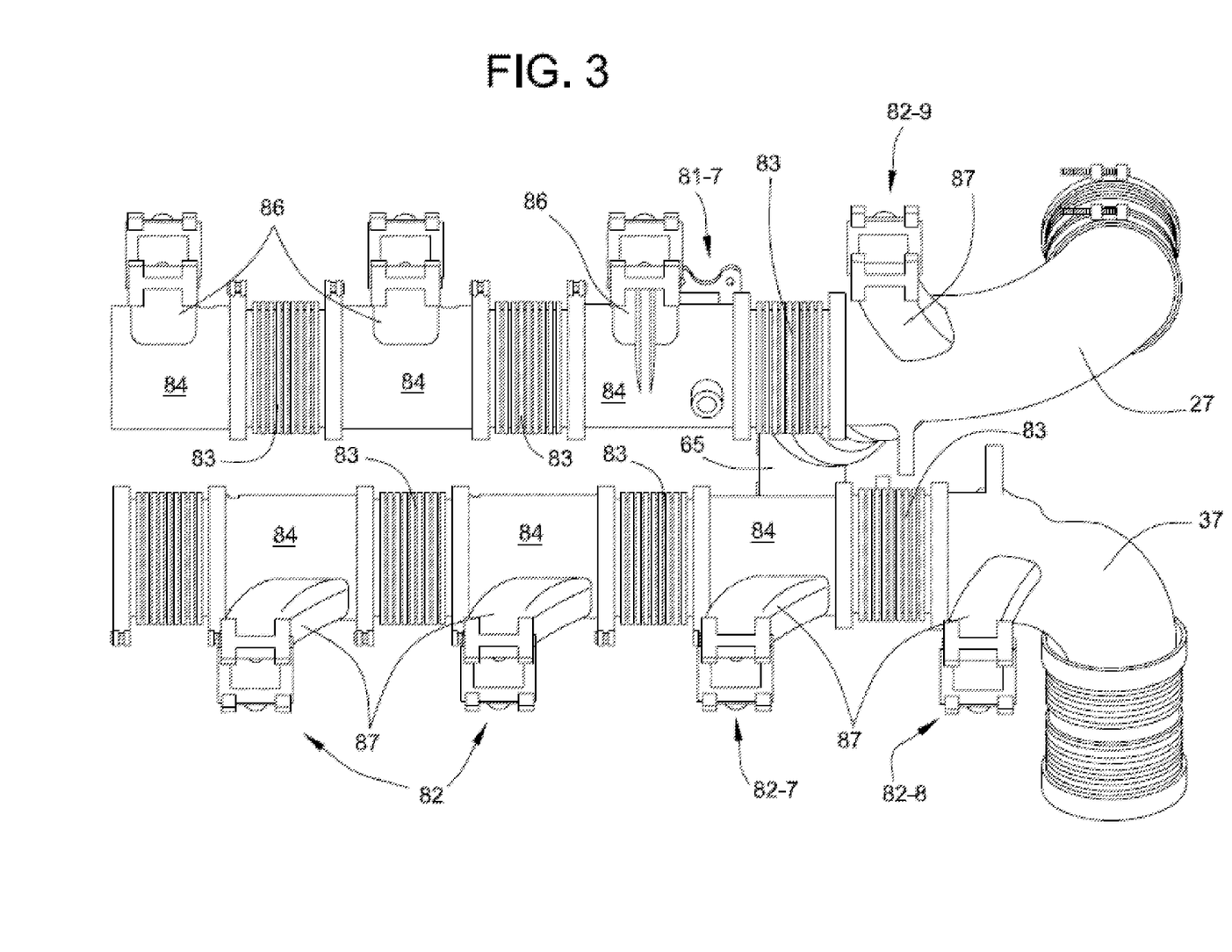
FIG. 3 is an enlarged bottom view of a portion of the exhaust manifolds and the exhaust gas balance tube of FIG. 2.

Referring to FIGS. 2-3, the first exhaust manifold 21 and the second exhaust manifold 31 are each formed of a plurality of interconnected exhaust manifold elements 80. More specifically, first exhaust manifold 21 includes seven non-direction specific exhaust manifold elements 81 that are each fluidly connected to one of the combustion cylinders 11 of the first cylinder group 16. The first exhaust manifold 21 further includes one modular pulse exhaust manifold element 82 positioned adjacent exhaust end 23 of the first exhaust manifold 21 and fluidly connected to the single combustion cylinder 11 of the second cylinder group 17 of the first cylinder bank 12. Each of the non-direction specific exhaust manifold elements 81 and the modular pulse exhaust manifold element 82 is mechanically and fluidly connected to an adjacent manifold element by connecting members 83.

The connecting members 83 may be formed with a bellows, a slip-fit joint or another structure that is capable of expanding and contracting to compensate for thermal expansion of the exhaust manifold elements 80. Each exhaust manifold element 80 includes a generally cylindrical hollow duct component 84 and a hollow pipe component 85 for fluidly connecting a combustion cylinder 11 to the duct component 84. The duct components 84 of the exhaust manifold elements 80 are spaced apart in an array connected by the connecting members 83 to form a generally linear tube-like duct portion 88 of the first exhaust manifold for directing exhaust gas from each combustion cylinder towards the exhaust end 23 of the first exhaust manifold. In other words, each of the connecting members 83 and duct components 84 is positioned along and forms a section of the generally linear tube-like duct portion 88.

All of the non-direction specific exhaust manifold elements 81 and the modular pulse exhaust manifold element 82 have generally identical duct components 84 except as described below. Non-direction specific exhaust manifold element 81 has a non-direction specific pipe component 86 that generally extends from the first cylinder head 14 in a generally straight manner to duct component 84. In the depicted embodiment, the non-direction specific pipe components 86 are generally perpendicular to centerline 91 of first exhaust manifold 21 so that the non-direction specific exhaust manifold elements have a generally "T-shaped" configuration.

Modular pulse exhaust manifold element 82 has a curved modular pulse pipe component 87 that generally extends from the first cylinder head 14 and fluidly connects the combustion cylinder 11 of the second cylinder group 17 of the first cylinder bank 12 to the duct component 84 of the modular pulse exhaust manifold element 82. The modular pulse pipe component 87 is configured to direct exhaust gas from a combustion cylinder 11 into the first exhaust manifold in a direction specific or direction biased exhaust flow pattern that includes the generation of a series of pulses of exhaust gas. In addition, the shape of the modular pulse pipe component 87 combined with the duct component 84 directs the exhaust gas towards the exhaust end 23 of the first exhaust manifold 21 and thus towards the first turbocharger 60.

The second exhaust manifold 31 is constructed in a manner similar to first exhaust manifold 21 and also has eight exhaust manifold elements 80. However, all of the exhaust manifold elements are modular pulse exhaust manifold elements 82 in order to direct exhaust gas from the second cylinder bank 13 and through the second exhaust gas line 30 towards the second turbocharger 61.

In the embodiment depicted in FIGS. 1-3, each of the exhaust manifold elements of the first exhaust manifold 21 associated with the first cylinder group 16 of first cylinder bank 12 is a non-direction specific exhaust manifold element 81 while the exhaust manifold element associated with the second cylinder group 17 of the first cylinder bank 12 is a modular pulse exhaust manifold element 82. As such, the first exhaust manifold 21 has both non-direction specific exhaust manifold elements 81 and a modular pulse exhaust manifold element 82.

By configuring the exhaust manifold elements of the first section 24 of the first exhaust manifold as non-direction specific exhaust manifold elements, exhaust gas may flow more easily towards the exhaust end 23 of first exhaust manifold 21 as well as towards exhaust gas recirculation system 40. If the exhaust manifold elements of the first section 24 of the first exhaust manifold were modular pulse exhaust manifold elements, the exhaust gas from the first section would be primarily directed towards exhaust end 23 of the first manifold.

With such a modular pulse configuration, in order to increase the amount of exhaust gas being recirculated through the exhaust gas recirculation system 40, the exhaust gas control valve 26 would be closed to a greater extent than if, as disclosed herein, the first exhaust manifold includes both non-direction specific exhaust manifold elements and modular pulse exhaust manifold elements. As a result, the configuration of the first exhaust manifold 21 results in a more efficient structure for the recirculation of exhaust gas.

The exhaust manifold elements may also include additional features and functionality. For example, non-direction specific exhaust manifold element 81-1 adjacent first end 22 of first exhaust manifold 21 has an opening 89 for fluidly connecting first exhaust manifold 21 to exhaust gas recirculation duct 41. Non-direction specific exhaust manifold element 81-7 includes exhaust gas control valve 26 to define the first cylinder group 16 and the second cylinder group 17. Modular pulse exhaust manifold element 82-9 of first exhaust manifold 21 includes the downstream balance tube connection port 67 for fluidly connecting to exhaust gas balance tube 65 and also includes the first extension pipe 27 in the shape of a curved end component for fluidly connecting to first turbocharger 60.

Modular pulse exhaust manifold element 82-7 of second exhaust manifold 31 includes the upstream balance tube connection port 66 for fluidly connecting to exhaust gas balance tube 65. Modular pulse exhaust manifold element 82-8 (FIG. 3) of second exhaust manifold 31 includes the second extension pipe 37 in the shape of a curved end component for fluidly connecting to second turbocharger 61.

Figure 4:
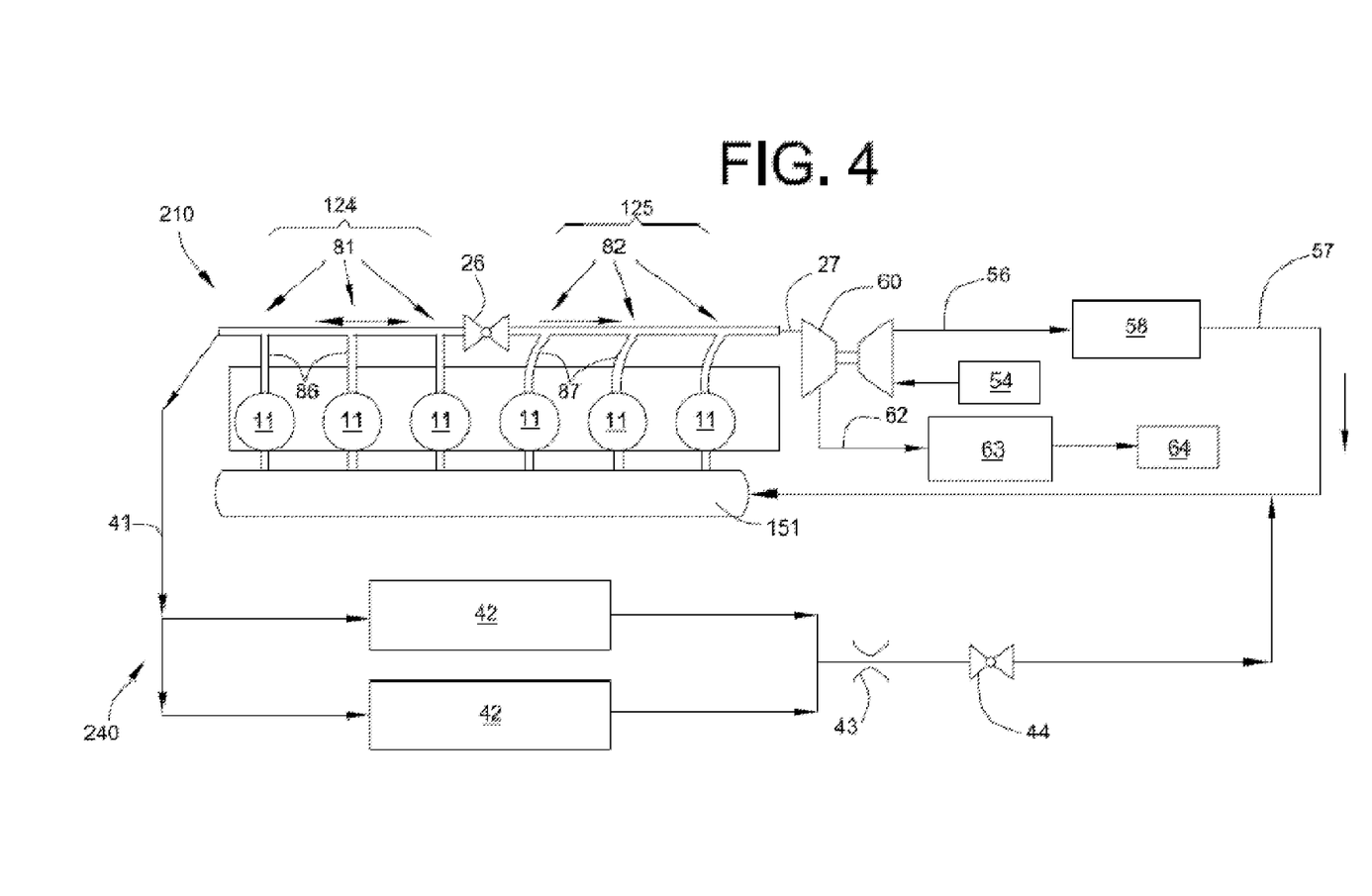
FIG. 4 is a schematic illustration of an internal combustion engine of an alternate embodiment having a single bank of combustion cylinders.

Although the internal combustion engine 10 and associated components depicted in FIGS. 1-3 include or relate to a pair of cylinder banks, certain aspects of the present disclosure may be used with internal combustion engines having a single, in-line bank of combustion cylinders. FIG. 4 depicts an internal combustion engine 210 similar to internal combustion engine 10 of FIG. 1 but having only a single, in-line cylinder bank 212. Identical or similar components of the embodiment depicted in FIG. 1 are identified with identical reference numbers.

Although the described EGR system configuration and resultant operation serve to significantly increase engine efficiency and lower engine emissions, the system is most beneficially operated when the recirculation is accurately controlled to provide the optimal mixture of fresh and recirculated charge. As discussed above, the described system includes an engine EGR valve 44 located between combustion cylinders 11 as well as an exhaust gas restriction valve (ERV) 26, both of which affect the extent to which recirculation occurs. For example if either is entirely shut, the recirculation is precluded, whereas if both are open, the recirculation is maximal.

However, neither state is ideal for system efficiency. For example, the ERV 26 serves a diversion function for recirculation purposes but also provides backpressure to improve engine operation under certain running conditions. Moreover, during certain other running conditions, backpressure may need to be removed, and yet unrestricted exhaust gas recirculation would negatively affect engine performance, efficiency, and emissions.

To this end, in an embodiment, for low EGR flow conditions, the EGR valve 44 is used to control EGR flow rate with the ERV 26 fully open. For higher flow levels, the EGR valve 44 is fully opened and the recirculation is controlled by modulating the state of the ERV 26. In an embodiment, the EGR valve 44 is smoothly transitioned between the on and off states when the flow requirement falls within a predefined range about the division between the low flow and high flow control regimes to provide a smooth transition.

While the described configuration can provide good control over the exhaust gas recirculation, more accurate control can be provided if the flow of diverted exhaust gas can be accurately measured. However, it is difficult to accurately measure exhaust flow rate across all possible rates from low to high. As noted above, the flow rate through exhaust gas recirculation duct 41 is monitored by a flow meter 43 which, in an embodiment, is a venturi-type flow meter. Unfortunately, venturi-type flow meters, while accurate at high flow rates, have a poor signal-to-noise ratio (S/N) at lower flow rates. Thus, it becomes difficult to accurately control the various valves involved in diversion at low rates because there is poor position rate feedback—the flow rate at those low rates is not known with good accuracy.

In an embodiment, the flow meter 43 is supplemented by a secondary flow measurement technique in a certain flow range. In particular, the inventors have observed that in the low flow regime, while the venturi meter may be inaccurate, the position of the EGR 44 itself can be processed to provide a good estimate of the flow rate of recirculated exhaust. In a further embodiment, when controlling low flow rates, the EGR valve 44 is modulated and the ERV 26 remains open. Thus, in this embodiment, during low flow rates, the position of the EGR valve 44 is used instead of the venturi meter reading to determine the precise flow rate. The EGR valve 44 position is converted to a valve effective area as shown in FIG. 5.

Figure 5:
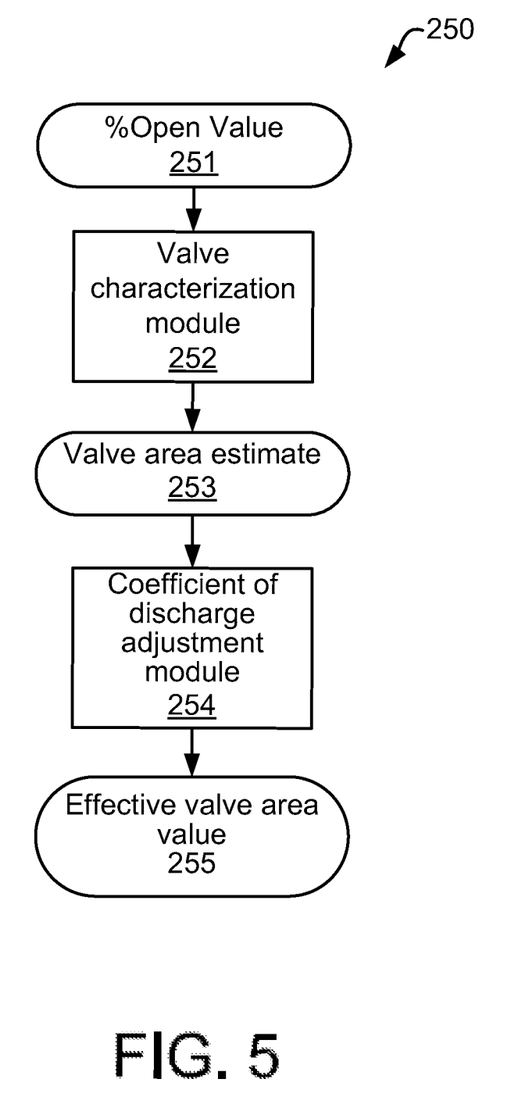
FIG. 5 is a data flow chart showing a process for determining effective valve area according to an embodiment of the disclosed principles.

In particular, FIG. 5 illustrates a data flow process 250 for exhaust recirculation flow estimation based on a position of the EGR valve 44. The process 250 accepts as input a percent open value 251 reflecting the percent value to which the EGR valve 44 is open. This percent open value 251 may be based on a positioning command given to position the EGR valve 44 or may be based on sensing the valve position via a rotary sensor or other sensor associated with the EGR valve 44.

The percent open value 251 is provided to a valve characterization module 252 which embodies data reflecting valve area as a function of percent open. The valve characterization module 252 thus produces a geometric valve area estimate 253, e.g., in mm2 or other suitable dimensions. While the valve area estimate 253 closely reflects the actual geometric valve area, the characteristics of actual gas flow conditions are incorporated in an embodiment to better model the actual flow attained through the EGR valve 44.

Thus the geometric valve area estimate 253 is provided as input to a coefficient of discharge adjustment module 254. The coefficient of discharge adjustment module 254 applies a coefficient of discharge adjustment map to convert from geometric valve area to effective valve area due to the losses incurred from flow patterns and air lifting especially at valve closing conditions. Thus, once the coefficient of discharge adjustment map has been applied, an effective valve area value 255 is generated.

As noted above, this calculation of effective valve area, taken in conjunction with the known exhaust pressure and other parameters, allows a derivation of actual exhaust flow, e.g., mass flow, However, the accuracy of this flow calculation decreases as the EGR flow rate increases. As also noted above, however, as the EGR flow rate increases, the Venturi differential pressure also increases. Under these conditions, the Venturi differential pressure begins to exhibit a S/N ratio suitable for accurate measurement of flow.

Additionally, in the high flow regime, the pressure drop across the EGR valve 44 is so low as to be negligible, since the valve is essentially wide open. Thus, polynomial estimation of flow based on sensed venturi differential pressure works well in this regime given that the venturi differential pressure is one of the polynomial terms. The inventors' analysis of flow data showed better regression correlations when the data was separated between low and high EGR flow rates, rather than fitting all through one model. The polynomial for each calculation will be discussed later with reference to FIG. 7.

The output of the two polynomial calculations is passed through weighting factors to allow for transition between the low flow rates and high flow rates as a function of the EGR valve 44 effective valve area. The structure of the polynomial is such that it can be used as a venturi pressure differential polynomial by zeroing all the EGR valve area variable coefficients for high flow rates. Similarly, for low flow rates, the venturi pressure differential variable coefficients are zeroed out, leaving the EGR valve area and other pressure and temperature terms to determine the flow rate.

Figure 6:
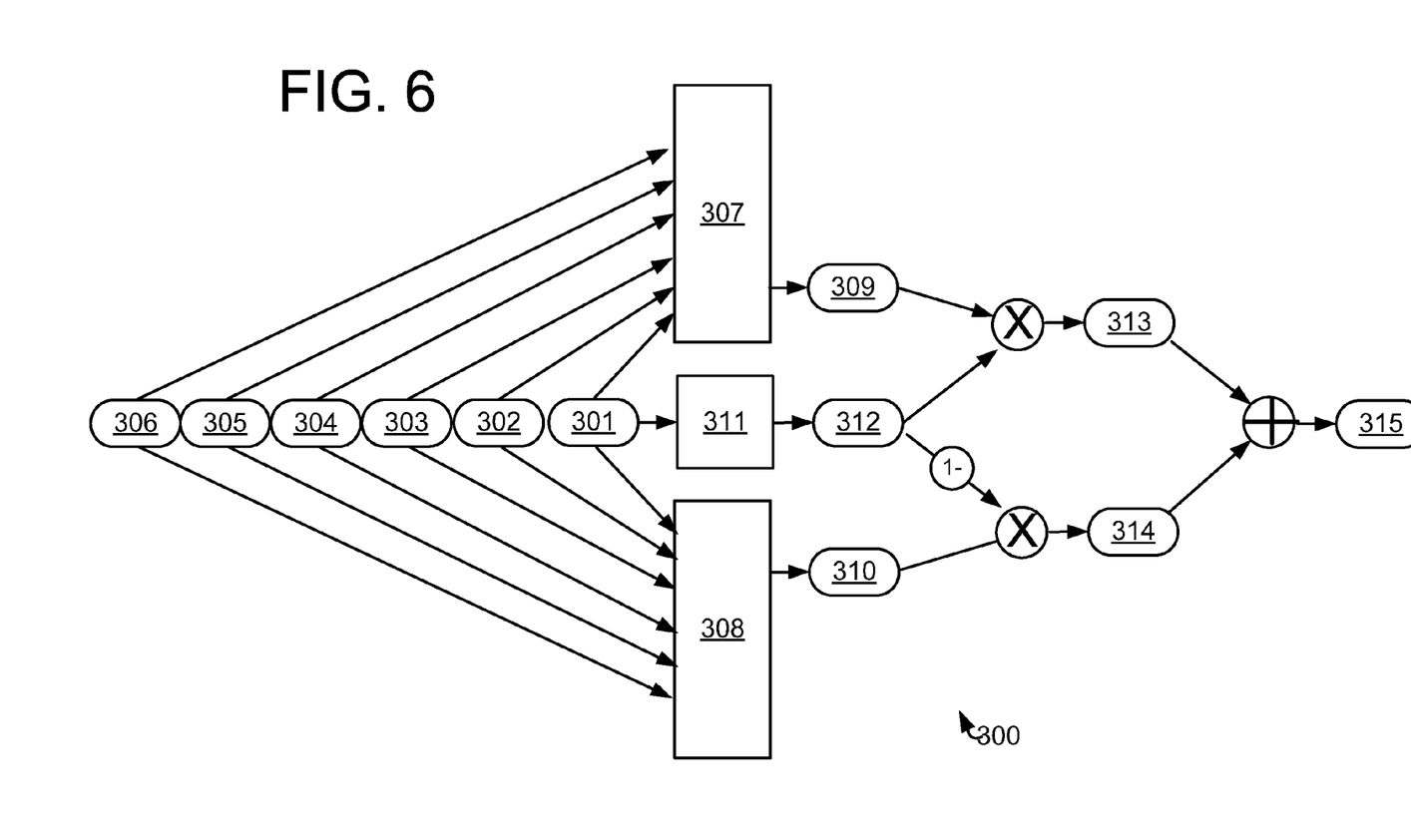
FIG. 6 is a process flow chart showing EGR flow calculation according to an aspect of an embodiment.

To utilize the described bifurcated polynomial approach to provide high accuracy EGR measurement at both high and low flow rates as discussed above, a control architecture 300 as shown in FIG. 6 may be used. In particular, FIG. 6 illustrates a control and data flow architecture for calculating an EGR flow across different flow rate regimes. The control architecture 300, which may be embodied in a hardware or software controller (via computer-executable instructions as discussed below), takes as its input a number of values including engine speed 301, venturi delta pressure 302, EGR absolute pressure 303, intake manifold pressure 304, EGR cooler out temperature 305, and EGR valve 44 effective area 306.

The foregoing input values are provided to two calculation modules, namely a low valve area flow calculation module 307 and a high valve area flow calculation module 308. Each of the low valve area flow calculation module 307 and high valve area flow calculation module 308 also take the polynomial coefficients as input. As noted above, the polynomial is used in the low valve area (low flow) calculation by zeroing the venturi pressure differential variable coefficients and allowing the EGR valve area and other pressure and temperature terms to determine the flow rate, while the polynomial is used for venturi pressure differential (high flow) calculation by zeroing the EGR valve area variable coefficients.

The low valve area flow calculation module 307 outputs a first flow estimate 309, while the high valve area flow calculation module 308 outputs a second flow estimate 310. Meanwhile, the EGR valve 44 effective area 306 is processed by a weighting module 311 to produce a weighting factor 312 reflecting whether the system is closer to a high flow regime or a low flow regime. For example, if the weight is 0.5, the state of the system may be said to lay evenly between the low flow and high flow regimes.

In an embodiment, the weighting factor 312 incorporates a percentage of maximum EGR valve 44 position angle or effective area, below which the first flow estimate 309 is weighted more heavily than the second flow estimate 310 and above which the second flow estimate 310 is weighted more heavily than the first flow estimate 309. In an embodiment, the percentage of maximum EGR valve 44 position or effective area 306 used to switch between a predominantly high flow estimate and a predominantly low flow estimate is between 10% and 15%.

Thus, for example, in the illustrated example, the weighting factor 312 would reach 0.5 when the EGR valve 44 effective area 306 is approximately 10-15% of its maximum potential value. In a further embodiment, the weighting factor 312 reaches substantially its lowest value of 0 (thus favoring the venturi measurement entirely) by about 20% EGR valve 44 effective area 306 or position angle.

As shown, the first flow estimate 309 is now weighted by the weighting factor 312 to produce a first weighted flow contribution 313 and the second flow estimate 310 is weighted by 1 minus the weighting factor 312 to produce a second weighted flow contribution 314. The first weighted flow contribution 313 and a second weighted flow contribution 314 are then added to yield the final flow value 315.

As noted above, the same polynomial is used is both the low flow estimation and the high flow estimation, by zeroing out the coefficients for inapplicable terms in each calculation. The polynomial is a first order polynomial of the form:

$$Ax_1 + Bx_2 + Cx_3 \ldots + \text{Const.} = \text{EGR Flow}$$

Figure 7:
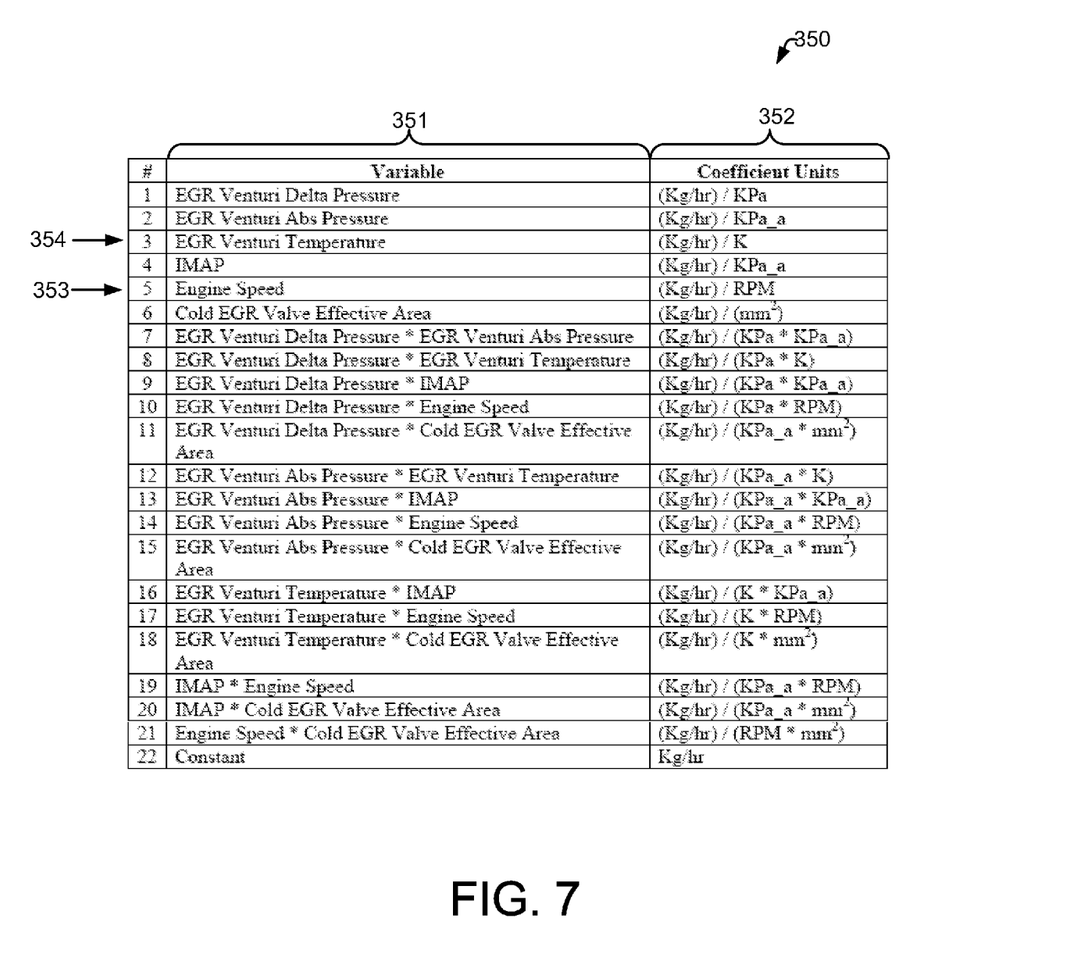
FIG. 7 is a chart showing polynomial variables and their coefficient units according to an embodiment.

The polynomial variables and coefficient units are shown in the table 350 of FIG. 7. In particular, the table 350 contains a list of variables 351, and a correlated list of coefficient units 352. Thus for example, the coefficient for the engine speed term 353 has units of (Kg/Hr)/rpm, while the coefficient for the EGR Venturi Temperature term 354 has units of (Kg/Hr)/K. In this way, the product of the engine speed term 353 and it's coefficient and the product of the EGR Venturi Temperature term 354 and its coefficient will both have units of (Kg/

Hr). The same holds true for each term in the polynomial, such that final units of the combined expression are in Kg/hr.

The variables used in the polynomial in a given implementation need not match those shown. Additionally, it will be appreciated that each module may receive other inputs, not shown, depending upon the implementation chosen. Moreover, while the description of the architecture references modules that execute various steps and functions, these modules need not be implemented strictly in hardware. For example, in an embodiment, one or more modules may be software modules, i.e., the computerized execution of computer-executable code read from a nontransitory computer-readable medium. The computer-readable medium is a non-transitory medium such as, but not limited to a RAM, ROM, EPROM, disc memory, flash memory, optical memory, and so on.

Although the described principles have been illustrated via a specific hardware arrangement, it will be appreciated that the described principles apply equally to any engine or engine system having an exhaust gas recirculation system including a positionable EGR valve and a venturi sensor to sense exhaust flow in the recirculation system.

Industrial Applicability

In order to accurately control exhaust gas recirculation and achieve efficiency and emissions goals, accurate measurement of EGR flow is needed. While a venturi may be used to provide a pressure-based measure of EGR flow, such a system is not accurate for all possible flow levels. When the EGR flow rate is low, the EGR valve 44 is somewhat closed, providing a flow restriction. In this situation, the venturi differential pressure will be especially low and therefore the S/N ratio is also low, preventing accurate venturi pressure readings. On the other hand, under these conditions, the pressure drop across the EGR valve 44 is large.

Thus, in an implementation of the described principles, a combined measurement system is provided wherein a flow estimate derived from the venturi pressure differential is weighted more heavily for high flow rates (more open EGR valve 44) and less heavily for low flow rates (less open EGR valve 44). In conjunction with this measurement and weighting, a flow estimate derived from the position of the EGR valve 44 position is weighted less heavily for high flow rates (more open EGR valve 44) and more heavily for low flow rates (less open EGR valve 44). The weighted combination of these estimates provides an accurate flow determination across all practical flow regimes whether high or low.

The described principles are applicable to many internal combustion engines. One exemplary type of such an internal combustion engine is one that utilizes an exhaust gas recirculation system. However, it will be appreciated that the foregoing description provides only examples of the disclosed system and technique. It is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method of measuring an exhaust gas recirculation (EGR) flow rate for an engine having an EGR valve with a selectable EGR valve position and having a venturi sensor situated to take a differential pressure measurement relative to recirculated exhaust gas, the method comprising:
calculating a first EGR flow estimate based on the EGR valve effective area;
calculating a second EGR flow estimate based on the differential pressure measurement of the venturi sensor; and
determining a final EGR flow rate based on both the first EGR flow estimate, the second EGR flow estimate, and a weighting factor applied between the first and second EGR flow estimates,
wherein the weighting factor favors the first EGR flow estimate when the selectable EGR valve position is below a predetermined value, and
wherein the weighting factor favors the second EGR flow estimate when the selectable EGR valve position is above a predetermined value.

2. The method of measuring an EGR flow rate according to claim 1, further comprising determining an EGR valve effective area based on the EGR valve position and one or more EGR valve characteristics.

3. The method of measuring an EGR flow rate according to claim 2, wherein determining the EGR valve effective area based on the EGR valve position further includes adjusting the estimated valve area based on flow conditions to determine the EGR valve effective area.

4. The method of measuring an EGR flow rate according to claim 1, wherein determining the final EGR flow rate based on the first EGR flow estimate and the second EGR flow estimate further includes calculating the weighting factor, wherein the weighting factor incorporates a percentage of maximum EGR valve effective area, below which the first EGR flow estimate is weighted more heavily than the second EGR flow estimate and above which the second EGR flow estimate is weighted more heavily than the first EGR flow estimate.

5. The method of measuring an EGR flow rate according to claim 4, wherein the percentage of maximum EGR valve effective area used to switch between a predominantly high flow estimate and a predominantly low flow estimate is between 10% and 15%.

6. The method of measuring an EGR flow rate according to claim 1, wherein the first EGR flow estimate and the second EGR flow estimate are both calculated from a common polynomial expression.

7. The method of measuring an EGR flow rate according to claim 6, wherein the common polynomial expression includes a plurality of variables, and wherein a first portion of the plurality of variables relate to the venturi pressure and a second portion of the plurality of variables relate to the EGR valve position.

8. The method of measuring an EGR flow rate according to claim 7, wherein the first EGR flow estimate is calculated from the common polynomial expression by zeroing coefficients of the second portion of the plurality of variables.

9. The method of measuring an EGR flow rate according to claim 7, wherein the second EGR flow estimate is calculated from the common polynomial expression by zeroing coefficients of the first portion of the plurality of variables.

10. An engine exhaust gas recirculation system comprising:
an exhaust gas recirculation (EGR) valve for selectively redirecting engine exhaust to an air intake of the engine via a flow path, the EGR valve having a position and a position sensor associated therewith;
a venturi pressure sensor located in the flow path for sensing a differential pressure based at least in part on the flow of redirected engine exhaust; and
a flow calculator for determining a rate of flow of the redirected engine exhaust, the flow calculator including a position-based estimator for generating a first estimate of the flow based on the position of the EGR valve, a pressure-based estimator for generating a second estimate of the flow based the differential pressure sensed by the venturi pressure sensor, and a weighting module for weighting the first and second estimates of the flow based on the EGR valve position,
such that the rate of flow of the redirected engine exhaust is determined as the sum of the weighted first and second estimates,
wherein the weighting factor favors the first estimate of the flow when the position is below a predetermined value, and
wherein the weighting factor favors the second estimate of the flow when the position is above the predetermined value.

11. The engine exhaust gas recirculation system according to claim 10, wherein the weighting module weights the first and second estimates based on an effective area of the EGR valve.

12. The engine exhaust gas recirculation system according to claim 11, wherein the effective area of the EGR valve is derived from the EGR valve position and one or more EGR valve characteristics.

13. The engine exhaust gas recirculation system according to claim 11, wherein the weighting module incorporates a percentage of maximum EGR valve effective area, below which the first flow estimate is weighted more heavily than the second flow estimate and above which the second flow estimate is weighted more heavily than the first flow estimate.

14. The engine exhaust gas recirculation system according to claim 13, percentage of maximum EGR valve effective area used to switch between a predominantly high flow estimate and a predominantly low flow estimate is between 10% and 15%.

15. The engine exhaust gas recirculation system according to claim 10, wherein the first flow estimate and the second flow estimate are both calculated from a common polynomial expression.

16. The engine exhaust gas recirculation system according to claim 15, wherein the common polynomial expression includes a plurality of variables, and wherein a first portion of the plurality of variables relate to the differential pressure sensed by the venturi and a second portion of the plurality of variables relate to the EGR valve position.

17. The engine exhaust gas recirculation system according to claim 16, wherein the first flow estimate is calculated from the common polynomial expression by zeroing coefficients of the second portion of the plurality of variables.

18. The engine exhaust gas recirculation system according to claim 16, wherein the second flow estimate is calculated from the common polynomial expression by zeroing coefficients of the first portion of the plurality of variables.

19. An engine control system for determining an exhaust gas recirculation (EGR) flow in an engine system having an EGR valve with a selectable EGR valve position and having a venturi sensor situated to take a differential pressure measurement relative to the recirculated exhaust gas, the engine control system including a controller executing computer-readable instructions including:
instructions for determining an EGR valve effective area based on the EGR valve position;
instructions for determining a weighting factor based on the EGR valve effective area;
instructions for calculating a first EGR flow estimate based on the EGR valve effective area;
instructions for calculating a second EGR flow estimate based on the differential pressure measurement of the venturi sensor; and
instructions for determining a final EGR flow rate based on the weighting factor, the first EGR flow estimate, and the second EGR flow estimate;
wherein the weighting factor favors the first EGR flow estimate, when the EGR valve position is below a predetermined value, and
wherein the weighting factor favors the second EGR flow estimate when the EGR valve position is above a predetermined value.

20. The engine control system according to claim 19, wherein the weighting factor incorporates a percentage of maximum EGR valve effective area, below which the first EGR flow estimate is weighted more heavily than the second EGR flow estimate and above which the second EGR flow estimate is weighted more heavily than the first EGR flow estimate.

* * * * *